US012468244B2

(12) United States Patent
Shiodera et al.

(10) Patent No.: US 12,468,244 B2
(45) Date of Patent: Nov. 11, 2025

(54) IMAGE FORMING APPARATUS

(71) Applicants: Kota Shiodera, Tokyo (JP); Masahiro Samei, Osaka (JP); Takayuki Andoh, Kanagawa (JP)

(72) Inventors: Kota Shiodera, Tokyo (JP); Masahiro Samei, Osaka (JP); Takayuki Andoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/672,428

(22) Filed: May 23, 2024

(65) Prior Publication Data

US 2024/0411253 A1 Dec. 12, 2024

(30) Foreign Application Priority Data

Jun. 12, 2023 (JP) ................................ 2023-096208

(51) Int. Cl.
*G03G 15/20* (2006.01)
*G03G 15/01* (2006.01)
*G06K 15/02* (2006.01)

(52) U.S. Cl.
CPC ....... *G03G 15/205* (2013.01); *G03G 15/0105* (2013.01); *G03G 15/2064* (2013.01); *G06K 15/1894* (2013.01)

(58) Field of Classification Search
CPC .................................................... G03G 15/205
See application file for complete search history.

(56) References Cited

U.S. PATENT DOCUMENTS

2012/0114358 A1* 5/2012 Sugiyama ............ G03G 15/205 399/69
2018/0024462 A1 1/2018 Shimada et al.
2019/0243292 A1* 8/2019 Imaizumi ........... G03G 15/2039
2023/0297010 A1 9/2023 Inoue et al.
2023/0297011 A1 9/2023 Shiodera et al.
2023/0297015 A1 9/2023 Yoshinaga et al.
2023/0297026 A1 9/2023 Andoh et al.
2023/0300269 A1 9/2023 Andoh et al.
(Continued)

FOREIGN PATENT DOCUMENTS

JP 2016-085407 A 5/2016
JP 2018-022130 A 2/2018
JP 2019-138959 A 8/2019

OTHER PUBLICATIONS

U.S. Appl. No. 18/604,556, filed Mar. 14, 2024.
U.S. Appl. No. 18/603,301, filed Mar. 13, 2024.
U.S. Appl. No. 18/607,588, filed Mar. 18, 2024.

*Primary Examiner* — Carla J Therrien
(74) *Attorney, Agent, or Firm* — Harness, Dickey & Pierce, P.L.C.

(57) ABSTRACT

An image forming apparatus includes a fixing device and circuitry. The fixing device includes a pair of rotators and a heater. The pair of rotators forms a nip through which recording media pass in a conveyance direction. The heater heats at least one of the pair of rotators to fix images printed on the recording media. The circuitry is configured to acquire image data of the images to be printed on the recording media within three minutes after a start of printing the images on the recording media and set an output of the heater to be lower than a predetermined reference value within the three minutes after the start of printing based on the image data.

6 Claims, 9 Drawing Sheets

(56) References Cited

U.S. PATENT DOCUMENTS

| | | | | |
|---|---|---|---|---|
| 2023/0305451 | A1 | 9/2023 | Sugiyama et al. | |
| 2023/0324838 | A1 | 10/2023 | Samei et al. | |
| 2023/0350329 | A1 | 11/2023 | Kabata et al. | |
| 2024/0004329 | A1 | 1/2024 | Yoshinaga et al. | |
| 2024/0036500 | A1 | 2/2024 | Samei et al. | |
| 2024/0319640 | A1* | 9/2024 | Kabata | G03G 15/2039 |
| 2024/0319641 | A1* | 9/2024 | Andoh | G03G 15/2053 |
| 2024/0319642 | A1* | 9/2024 | Samei | G03G 15/2053 |

* cited by examiner

IMAGE FORMING APPARATUS

CROSS-REFERENCE TO RELATED APPLICATION

This patent application is based on and claims priority pursuant to 35 U.S.C. § 119(a) to Japanese Patent Application No. 2023-096208, filed on Jun. 12, 2023, in the Japan Patent Office, the entire disclosure of which is hereby incorporated by reference herein.

BACKGROUND

Technical Field

Embodiments of the present disclosure relate to an image forming apparatus.

Related Art

In an image forming apparatus such as a copier or a printer, technologies to remove foreign substances such as fine particles from exhaust gas are known in the art.

Currently, due to an increase in the awareness of environmental issues, the reduction of fine particles discharged from products has been desired. In image forming apparatuses such as copiers, printers, and multifunction peripherals that use electrophotographic process, developing the image forming apparatuses that reduce the generation of fine particles has been also desired. Environmental concerns are very high, especially in Europe. There are various authorization standards for volatile organic compounds (VOC), ozone, dust, and fine particles that are generated during image formation. For example, the Blue Angel has been the ecolabel of the German Federal Government. Only certified products and services are permitted to use the label. The Blue Angel certification requires various tests to be cleared. In particular, tests for fine particles are very strict. Specifically, the number of fine particles of 5.6 nm to 560 nm that are generated from the image forming apparatus and measured by the FAST MOBILITY PARTICLE SIZER (FMPS) is required to be less than $3.5\times10^{11/10}$ minutes. A stricter reference value may be set in the future.

SUMMARY

This specification describes an improved image forming apparatus that includes a fixing device and circuitry. The fixing device includes a pair of rotators and a heater. The pair of rotators forms a nip through which recording media pass in a conveyance direction. The heater heats at least one of the pair of rotators to fix images printed on the recording media. The circuitry is configured to acquire image data of the images to be printed on the recording media within three minutes after a start of printing the images on the recording media and set an output of the heater to be lower than a predetermined reference value within the three minutes after the start of printing based on the image data.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
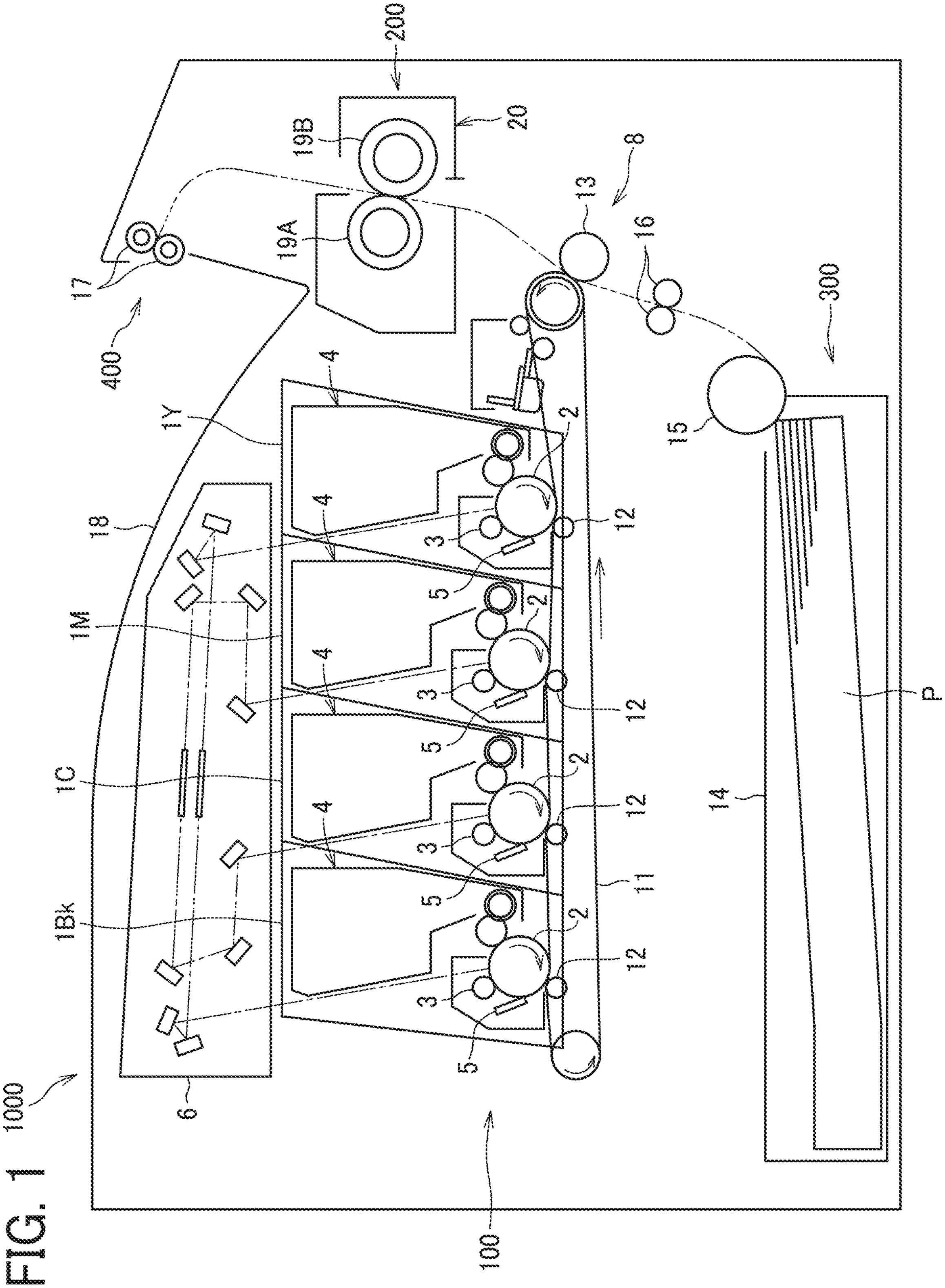
FIG. 1 is a schematic diagram illustrating a configuration of an image forming apparatus according to a first embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a," "an," and "the" are intended to include the plural forms as well, unless the context clearly indicates otherwise.

Referring now to the drawings, embodiments of the present disclosure are described below. In the drawings for illustrating embodiments of the present disclosure, elements or components identical or similar in function or shape are given identical reference numerals as far as distinguishable, and redundant descriptions are omitted.

<Structure of Image Forming Apparatus>

FIG. 1 is a schematic diagram illustrating a configuration of an image forming apparatus according to a first embodiment of the present disclosure. In the following description, the "image forming apparatus" includes a printer, a copier, a facsimile machine, or a multifunction peripheral having at least two of printing, copying, scanning, and facsimile functions. In the following description, "printing" is synonymous with "image formation." "Image formation" means the formation of images with meanings such as characters and figures and the formation of images with no meanings such as patterns. Initially, with reference to FIG. 1, a description is given below of the overall configuration and operation of an image forming apparatus 1000 according to the first embodiment of the present disclosure. As illustrated in FIG. 1, the image forming apparatus 1000 according to the first embodiment of the present disclosure includes an image forming section 100, a fixing section 200, a recording medium feeder 300, and a recording medium ejection section 400.

(Image Forming Section)

The image forming section 100 forms an image on a sheet-shaped recording medium such as a sheet. The image forming section 100 includes four image forming units 1Y, 1M, 1C, and 1Bk, an exposure device 6, and a transfer device 8.

The image forming units 1Y, 1M, 1C, and 1Bk have the same configuration except for containing different color toners (developers), i.e., yellow (Y), magenta (M), cyan (C), and black (Bk) toners, respectively, corresponding to decomposed color separation components of a full-color image. Each of the image forming units 1Y, 1M, 1C, and 1Bk includes a photoconductor 2, a charger 3, a developing device 4, and a cleaner 5.

The photoconductor 2 bears an electrostatic latent image on its surface and rotates. Examples of the photoconductor 2 include an endless belt-shaped photoconductor in addition to a drum-shaped photoconductor as illustrated in FIG. 1.

The charger 3 charges the surface of the photoconductor 2. The charging system of the charger 3 is not limited to a particular system as long as the charger 3 applies a voltage to the surface of the photoconductor 2 to uniformly charge the surface of the photoconductor 2. The charging system of the charger 3 can be selected as appropriate depending on the purpose. Specifically, examples of the charger 3 include a contact type charger such as a conductive or semiconductive charging roller, a magnetic brush, a fur brush, a film, or a rubber blade, and a non-contact type charger using corona discharge.

The developing device 4 supplies toner as the developer to the electrostatic latent image of the photoconductor 2 to form a toner image. The developing device 4 includes a toner bearer disposed in contact with or adjacent to the photoconductor 2. The toner bearer bears the toner on the surface of the toner bearer and rotates to supply toner from the toner bearer to the photoconductor 2.

The cleaner 5 removes the toner and other foreign matters remaining on the photoconductor 2. Examples of the cleaner 5 include a cleaning blade disposed to be in contact with the surface of the photoconductor 2. While the photoconductor 2 rotates, the cleaner 5 removes the residual toner and foreign matters on the photoconductor 2.

The exposure device 6 exposes the charged surface of the photoconductor 2 to form an electrostatic latent image on the surface of the photoconductor 2.

The exposure system of the exposure device 6 is not limited to a particular system as long as the exposure device 6 can expose the charged surface of the photoconductor 2, and can be appropriately selected depending on the purpose. Specific examples of the exposure device include various exposure devices such as a copying optical system, a rod lens array system, a laser optical system, a liquid crystal shutter optical system, and an LED optical system.

The transfer device 8 transfers an image onto a recording medium. The transfer device 8 includes an intermediate transfer belt 11, primary transfer rollers 12, and a secondary transfer roller 13. The intermediate transfer belt 11 is an endless belt stretched by a plurality of support rollers. Four primary transfer rollers 12 are disposed inside the loop of the intermediate transfer belt 11. Each of the primary transfer rollers 12 is in contact with the corresponding photoconductor 2 via the intermediate transfer belt 11 to form a primary transfer nip between the intermediate transfer belt 11 and each photoconductor 2. The secondary transfer roller 13 is in contact with the outer circumferential surface of the intermediate transfer belt 11 to form a secondary transfer nip.

(Fixing Section)

The fixing section 200 fixes an image onto a recording medium. The fixing section 200 includes a fixing device 20 that fixes the image onto the sheet. The fixing device 20 includes a pair of rotators 19A and 19B that heats, presses, and conveys the recording medium.

(Recording Medium Feeder)

The recording medium feeder 300 supplies the recording medium to the image forming section 100. The recording medium feeder 300 includes a sheet tray 14 to store sheets P as recording media and a feed roller 15 to feed the sheet P from the sheet tray 14 to the image forming section 100. Although a "recording medium" is described as a "sheet of paper," which is referred to simply as "sheet" in the following description, the "recording medium" is not limited to the sheet of paper. Examples of the "recording medium" include not only a sheet of paper but also an overhead projector (OHP) transparency sheet, a fabric, a metallic sheet, a plastic film, and a prepreg sheet including carbon fibers previously impregnated with resin. Examples of the "sheet" include thick paper, a postcard, an envelope, thin paper, coated paper (e.g., coat paper and art paper), and tracing paper, in addition to plain paper.

(Recording Medium Ejection Section)

The recording medium ejection section 400 ejects the sheet P that is the recording medium to the outside of the image forming apparatus 1000. The recording medium ejection section 400 includes an output roller pair 17 to eject the sheet P to the outside of the image forming apparatus 1000 and an output tray 18 to stack the sheet P ejected by the output roller pair 17.

<Image Forming Operation>

To provide a fuller understanding of the embodiments of the present disclosure, a description is now given of the image forming operation of the image forming apparatus 1000 according to the present embodiment, with continued reference to FIG. 1.

In response to starting the image forming operation, the photoconductors 2 in the image forming units 1Y, 1M, 1C, and 1Bk and the intermediate transfer belt 11 in the transfer device 8 start rotating. The feed roller 15 starts rotating to feed the sheet P from the sheet tray 14. The sheet P fed from the sheet tray 14 is brought into contact with a timing roller pair 16 and temporarily stopped until the image forming section 200 forms the image to be transferred to the sheet P.

In each of the image forming units 1Y, 1M, 1C, and 1Bk, the charger 3 uniformly charges the surface of the photoconductor 2 at a high electric potential. Based on image data of a document read by a document reading device or print data instructed to print by a terminal, the exposure device 6 exposes the charged surface of each of the photoconductors 2. As a result, the electric potential at an exposed portion on the surface of each of the photoconductor 2 is decreased. Thus, an electrostatic latent image is formed on the surface of each of the photoconductors 2. The developing device 4 supplies toner to the electrostatic latent image formed on the photoconductor 2 to develop the electrostatic latent image and form the toner image on the photoconductor 2. As the photoconductor 2 rotates, the toner image that is thus formed on the photoconductor 2 reaches the primary transfer nip defined by the primary transfer roller 12. At the primary transfer nip, the toner image is transferred onto the intermediate transfer belt 11 rotating. Specifically, the toner images are sequentially transferred from the respective photoconductors 2 onto the intermediate transfer belt 11 such that the toner images are superimposed one atop another, as a composite full-color toner image on the intermediate transfer belt 11. Thus, the full-color toner image is formed on the intermediate transfer belt 11. The image forming operation is not limited to the above-described full color image forming operation that uses all four image forming units 1Y, 1M, 1C, and 1Bk. Alternatively, the image forming apparatus 1000 can form a monochrome toner image by using any one of the four process units 1Y, 1M, 1C, and 1Bk, or can form a bicolor toner image or a tricolor toner image by using two or three of the process units 1Y, 1M, 1C, and 1Bk. After the toner image is transferred to the intermediate transfer belt 11, the cleaner 5 cleans the surface of the photoconductor 2. As a result, the cleaner 5 removes foreign matter such as residual toner on the photoconductor 2.

In accordance with the rotation of the intermediate transfer belt 11, the toner image transferred onto the intermediate transfer belt 11 is conveyed to the secondary transfer nip (the position of the secondary transfer roller 13) and is transferred onto the sheet P conveyed by the timing roller pair 16. The sheet P bearing the toner image is conveyed to the fixing device 20. In the fixing device 20, the pair of rotators 19A and 19B applies heat and pressure to the sheet P to fix the toner image onto the sheet P. The sheet P bearing the fixed toner image is ejected by the output roller pair 17 onto the outside of the image forming apparatus 1000 and is stacked on the output tray 18. Thus, a series of image forming operations is completed.

<Basic Configuration of Fixing Device>

The fixing device 20 according to a first embodiment of the present disclosure is described below.

Figure 2:
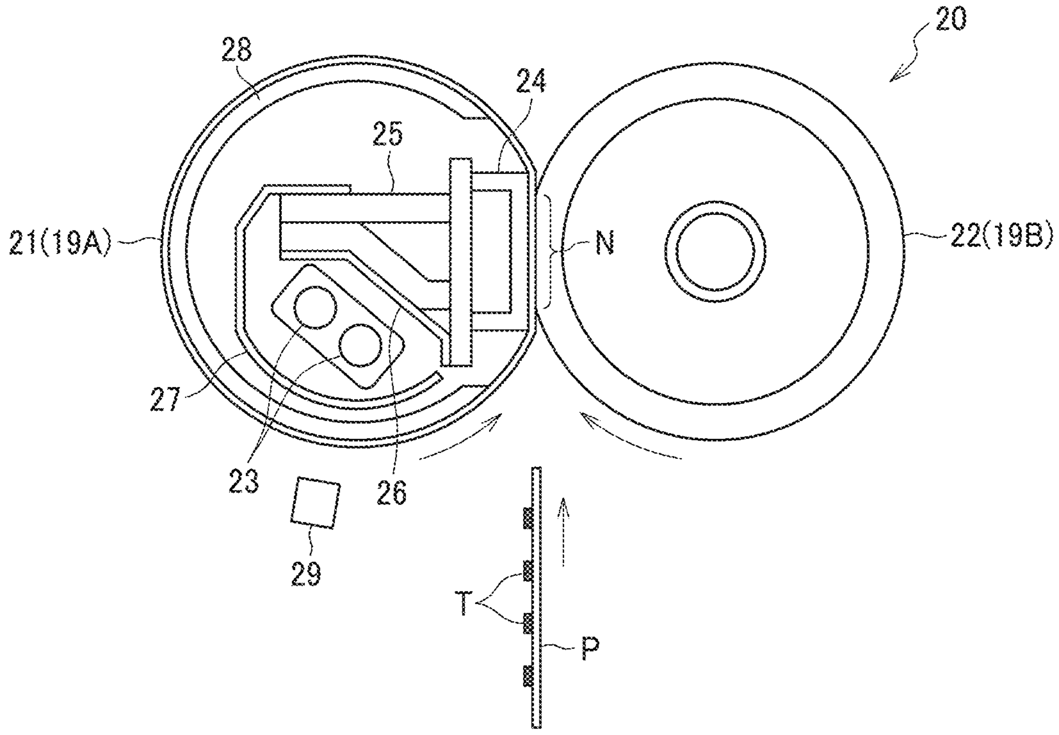
FIG. 2 is a schematic diagram illustrating a configuration of a fixing device installed in the image forming apparatus of FIG. 1.

As illustrated in FIG. 2, the fixing device 20 according to the first embodiment of the present disclosure includes halogen heaters 23, a nip formation pad 24, a support 25, a reflector 26, shields 27, rotator holders 28, and temperature sensors 29 in addition to the pair of rotators 19A an 19B.

The pair of rotators 19A and 19B includes a fixing belt 21 as a first rotator 19A disposed on an image bearing side of the sheet P on which the unfixed image is borne (in other words, a toner image T side) and a pressure roller 22 as a second rotator 19B disposed to face the outer circumferential face of the first rotator 19A.

The fixing belt 21 is an endless belt including a base layer, an elastic layer, and a release layer successively layered from the inner circumferential surface to the outer circumferential surface. The base has, for example, a thickness of 30 μm to 50 μm and is made of metal such as nickel or stainless steel or resin such as polyimide. The elastic layer has a thickness of 100 μm to 300 μm and is made of rubber such as silicone rubber, silicone rubber foam, or fluorine rubber. The elastic layer of the fixing belt 21 prevents the fixing belt 21 from forming slight surface asperities, thus facilitating uniform conduction of heat to the toner image on the sheet P. The release layer of the fixing belt 21 has a thickness of 10 μm to 50 μm and is made of, for example, tetrafluoroethylene-perfluoroalkyl vinyl ether copolymer (PFA), polytetrafluoroethylene (PTFE), polyimide, polyetherimide, or polyether sulfide (PES). The release layer of the fixing belt 21 facilitates the separation of toner contained in the toner image T on the sheet P from the fixing belt 21. In other words, the release layer of the fixing belt 21 facilitates the release of the toner from the fixing belt 21. To reduce the size and thermal capacity of the fixing belt 21, the fixing belt 21 preferably has a total thickness equal to or less than 1 mm and a loop diameter equal to or less than 30 mm.

The pressure roller 22 includes a cored bar having a cylindrical shape or a columnar shape, an elastic layer on the outer circumferential surface of the cored bar, and a release layer on the outer circumferential surface of the elastic layer. The cored bar is made of, for example, metal such as iron. Examples of the material of the elastic layer include silicone rubber, silicone rubber foam, and fluororubber. The release layer is made of, for example, fluororesin such as PFA or PTFE.

The halogen heater 23 is a radiant heat type heat source that radiates infrared rays (infrared light) that generate radiant heat to heat an object. The fixing device 20 according to the present embodiment includes two halogen heaters 23 inside the loop of the fixing belt 21. The halogen heaters 23 radiate infrared rays, and the radiant heat heats the inner face of the fixing belt 21. As the heat source, other than the halogen heater, another radiant heat type heat source such as a carbon heater may be used. Alternatively, the fixing belt 21 may include a metal layer, and an electromagnetic induction heating (IH) system may be used as the heat source. In the IH system, electromagnetic induction generates heat in the metal layer. The number of heat sources is not limited to two and may be one or three or more.

The nip formation pad 24 is disposed inside the loop of the fixing belt 21 and sandwiches the fixing belt 21 together with the pressure roller 22, to form a nip N. The nip formation pad 24 is preferably made of a heat-resistant member having a heat-resistant temperature equal to or higher than 200° C. For example, the nip formation pad 24 is made of a typical heat-resistant resin such as polyether sulfone (PES), polyphenylene sulfide (PPS), liquid crystal polymer (LCP), polyether nitrile (PEN), polyamide-imide (PAI), or polyether ether ketone (PEEK). The nip formation pad 24 made of such a heat-resistant material can prevent the nip formation pad 24 from being deformed by heat, and stabilize the shape of the nip N. Instead of the planar shape as illustrated in FIG. 2, the shape of the nip N may be a curve or another shape.

The support 25 supports the nip formation pad 24. The support 25 supports a back face of the nip formation pad 24, and a front face of the nip formation pad 24 faces the pressure roller 22. As a result, the support 25 prevents the nip formation pad 24 from being bent by the pressure of the pressure roller 22 and enables obtaining a uniform width of the nip N. The support 25 is preferably made of iron-based metal such as steel use stainless (SUS) or steel electrolytic cold commercial (SECC) to enhance the rigidity.

The reflector 26 reflects radiant heat emitted from the halogen heaters 23 toward the fixing belt 21. The reflector 26 faces the halogen heater 23 that is inside the loop of the fixing belt 21 to reflect radiant heat. The reflector 26 reflects the radiant heat radiated from the halogen heater 23 toward the fixing belt 21, and the reflected radiant heat effectively heats the fixing belt 21. In the present embodiment, the reflector 26 disposed between the halogen heater 23 and the support 25 prevents the radiant heat from being unnecessarily radiated to the support 25, which enables energy saving.

The shield 27 is interposed between the halogen heater 23 and the fixing belt 21 and shields the fixing belt 21 from the radiant heat radiated by the halogen heater 23. The shield 27 is made of a metal plate having a thickness of 0.1 mm to 1.0 mm so as to have an arc shape along the inner peripheral surface of the fixing belt 21. The material of the shield 27 may be any material that can shield the fixing belt 21 from the radiant heat. The material of the shield 27 is preferably material having thermal resistance, for example, metal such as aluminum, iron, or stainless steel, or ceramics. The shield 27 may completely shield the radiant heat or may shield a part of the radiant heat.

The rotator holders 28 rotatably hold the fixing belt 21. Inserting the rotator holders 28 into both ends of the loop of the fixing belt 21 rotatably holds the inner circumferential surface of the fixing belt 21.

The temperature sensor 29 is a temperature detector that detects the temperature of the fixing belt 21. In the present embodiment, the temperature sensor 29 is a non-contact type temperature sensor that is disposed so as not to contact the outer circumferential surface of the fixing belt 21. The temperature sensor 29 is not limited to the non-contact type temperature sensors and may be contact type temperature sensors that contact the surface of the fixing belt 21 to detect the surface temperature.

Figure 3:
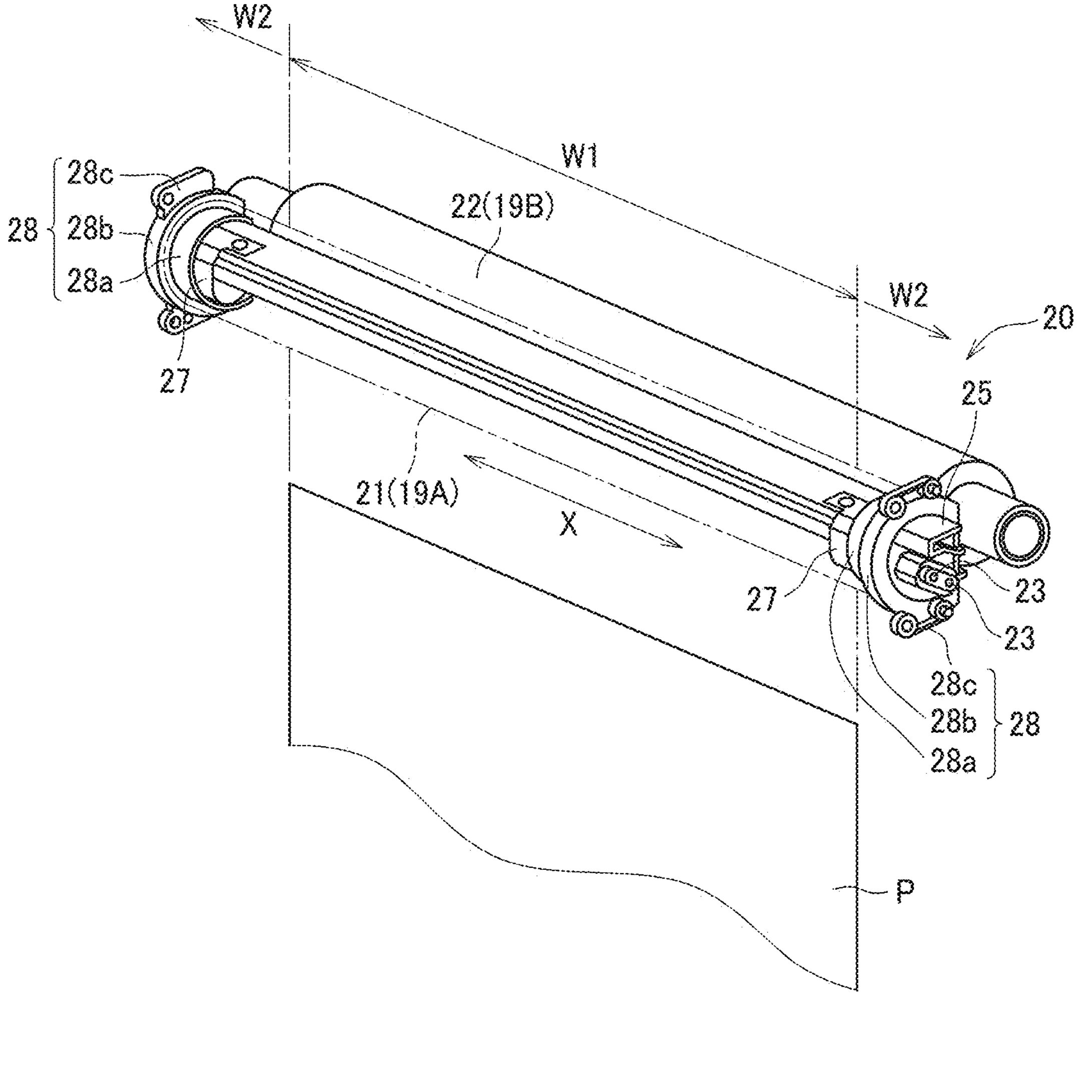
FIG. 3 is a perspective view of the fixing device according to the first embodiment.

FIG. 3 is a perspective view of the fixing device 20 according to the first embodiment.

As illustrated in FIG. 3, the shields 27 are disposed to face non-sheet-passing regions W2 of the fixing belt 21. The sheet does not pass and contact the non-sheet-passing region of the fixing belt 21. The non-sheet-passing regions W2 are outside both ends of a maximum sheet-passing region (in other words, a maximum recording medium region) W1 of the fixing belt 21. The sheet P having the largest width passes and contacts the maximum sheet-passing region W1.

The halogen heater 23 has a feature that a heat generation amount at each of the ends of the heat generation region is lower than a heat generation amount at the center of the heat generation region. For this reason, if the halogen heater 23 has the heat generating region disposed in the same range as the maximum sheet-passing region W1, the temperature of the fixing belt 21 is likely to drop at the end of the maximum sheet-passing region W1. Extending the heat generation region to be longer than the maximum sheet-passing region W1 so as to uniformly heat the maximum sheet-passing region W1 prevents the temperature drop at the end of the maximum sheet-passing region W1. However, both ends of the heat generation region longer than the maximum sheet-passing region W1 radiate infrared rays to the non-sheet-passing regions W2. As a result, an excessive temperature rise may occur in the non-sheet-passing region W2 of the fixing belt 21 when the sheets continuously pass through the fixing device 20. To prevent the excessive temperature rise, the shield 27 in the present embodiment is disposed to face the non-sheet-passing region W2. The shield 27 disposed to face the non-sheet-passing region W2 shields the non-sheet-passing region W2 from the infrared rays radiated to the non-sheet-passing region W2 and prevents the excessive temperature rise in the non-sheet-passing region W2 when the sheets continuously pass through the fixing device 20. On the other hand, since the shield 27 is not disposed to face the maximum sheet-passing region W1, the heat generation region constantly and satisfactorily heats the fixing belt 21.

As illustrated in FIG. 3, a pair of rotator holders 28 are disposed at both ends of the fixing belt 21 in the longitudinal direction X of the fixing belt 21 to rotatably hold the fixing belt 21. The above-described longitudinal direction means a direction orthogonal to the rotation direction of the fixing belt 21 and along the outer circumferential surface of the fixing belt 21. The "longitudinal direction" is a direction indicated by an arrow X in FIG. 3 and is the same direction as the longitudinal direction of the pressure roller 22, the rotation axis direction of the pressure roller 22, and the width direction of the sheet passing through the nip N (that is the direction intersecting with the sheet conveyance direction).

Each of the pair of rotator holders 28 includes a holder 28*a* having a C-shape in the cross-section, a restrictor 28*b*, and a fixed portion 28*c*. The holder 28*a* is inserted into the end of the fixing belt 21. Inserting the holders 28*a* into both ends of the loop of the fixing belt 21 rotatably holds the fixing belt 21. The restrictor 28*b* restricts a skew of the fixing belt 21 in the longitudinal direction X of the fixing belt 21. The edge of the fixing belt 21 skewed in the longitudinal direction X abuts against the restrictor 28*b* having a larger diameter than that of the holder 28*a* so that the skew of the fixing belt 21 in the longitudinal direction X is restricted. The fixed portion 28*c* is fixed to a frame such as a side plate of the fixing device 20. Since the fixed portion 28*c* is fixed to the frame, the rotator holders 28 rotatably hold the fixing belt 21.

The fixing device 20 according to the first embodiment of the present disclosure operates as follows.

When the image forming operation starts, a driver starts rotating the pressure roller 22 in a direction indicated by an arrow in FIG. 2, and the rotation of the pressure roller 22 rotates the fixing belt 21. A power supply supplies power to the halogen heaters 23, and the halogen heater 23 radiates radiant heat to heat the fixing belt 21. After the temperature of the fixing belt 21 reaches a predetermined target temperature, the sheet P bearing an unfixed toner image (the toner image T) is conveyed to the nip N between the fixing belt 21 and the pressure roller 22 to apply heat and pressure to the sheet P. As a result, the unfixed image is fixed onto the sheet P. Thereafter, the sheet P is ejected to the outside of the image forming apparatus 1000.

<Mechanism Generating Fine Particles>

The following describes a mechanism generating fine particles in the image forming apparatus. The "fine particles" described in this specification mean fine particles including ultrafine particles measured by an apparatus and conditions in conformity with the fine particles standard of Blue Angel and mean particles having a particle size of 5.6 nm or more and 560 nm or less. Hereinafter, the "fine particles" are referred to as "FP/UFP."

A factor of occurrence of FP/UFP is wax contained in the toner. The toner image is transferred to the sheet, and the sheet is conveyed to the fixing device. In the fixing device, applying heat and pressure to the toner image and the sheet fixes the toner image onto the sheet. Applying heat to the toner image increases the temperature of wax in the toner, and the wax is volatilized. After the wax is volatilized, the wax is cooled to a solid to form the FP/UFP.

<Generation Amount of FP/UFP during Continuous Printing>

Figure 4:
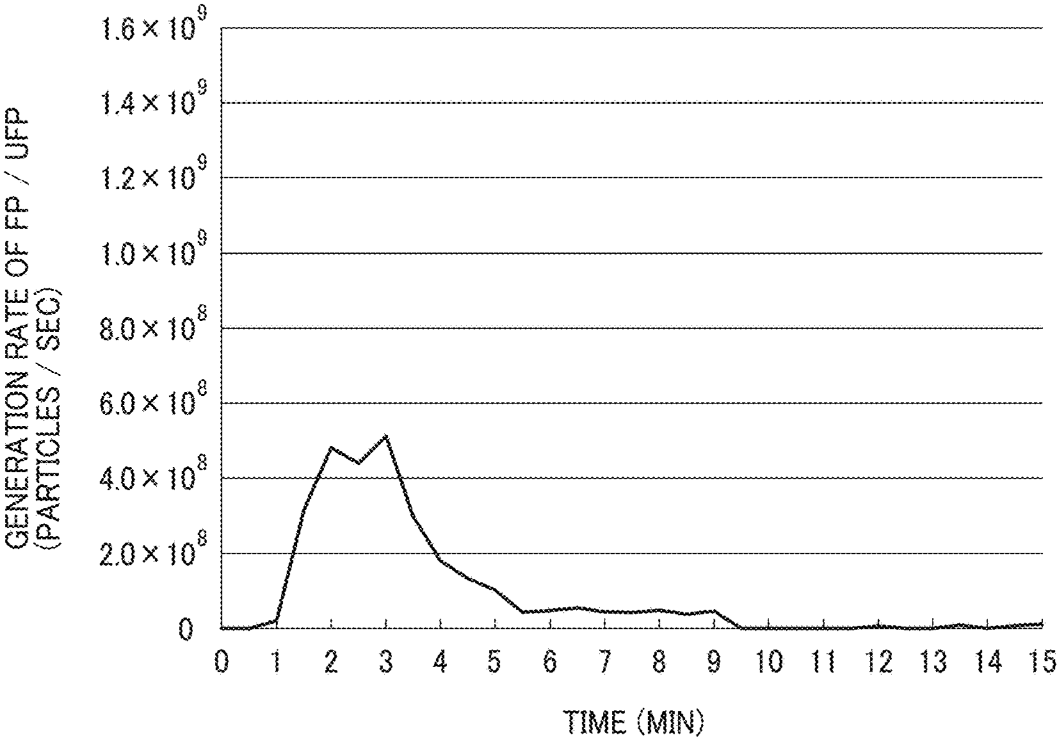
FIG. 4 is a graph illustrating generation rates of fine particles including ultrafine particles that are generated from toner during continuous printing.

FIG. 4 is a graph illustrating generation rates of FP/UFP that are generated from toner during continuous printing.

In FIG. 4, the horizontal axis represents a time elapsed after the start of printing, and the vertical axis represents the generation rate of FP/UFP for each time that is the number of particles per second.

In an experiment to measure the generation rate of the FP/UFP illustrated in FIG. 4, the image forming apparatus was placed in a test room conforming to Blue Angel DE UZ219. The image forming apparatus performed continuous printing for nine minutes, and the FP/UFP were measured by the measuring method conforming to Blue Angel DE UZ219. The generation rate of the FP/UFP during the continuous printing was measured by a measuring device (FAST MOBILITY PARTICLE SIZER (FMPS) Model 3091 manufactured by TSO Incorporated).

In order to measure only the FP/UFP generated from the toner, the FP/UFP generation factors other than the toner were excluded. The FP/UFP is generated not only from the toner but also from a liquid or semi-solid lubricant used to enhance the sliding property of the fixing belt. To exclude the FP/UFP generated from the wax in the experiment, the lubricant was not used in the fixing device.

In the result of the experiment illustrated in FIG. 4, the generation rate of FP/UFP rapidly increased until three minutes elapsed after the start of printing and gradually decreased after three minutes elapsed. From this, the present inventors found that a lot of FP/UFP particularly occurred until three minutes elapsed after the start of printing.

<Relationship Between Turn-on Duty of Halogen Heater and Amount of Occurrence of FP/UFP>

Figure 5:
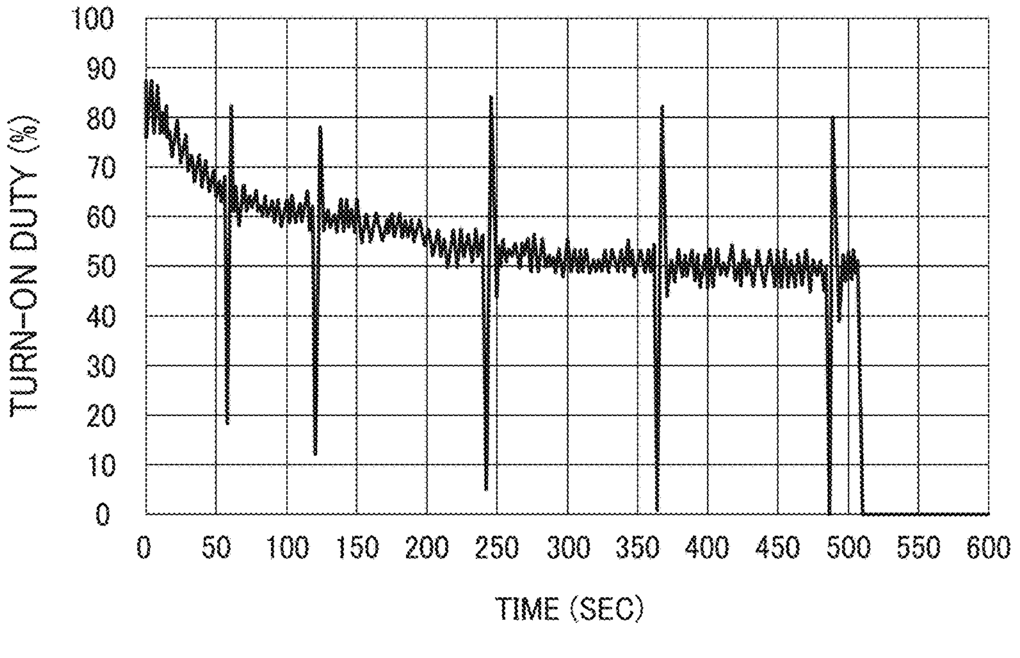
FIG. 5 is a graph illustrating a change in turn-on duties of the halogen heater during continuous printing.

FIG. 5 is a graph illustrating a change in turn-on duties of the halogen heater during continuous printing.

A central processing unit (CPU) in a controller determines the turn-on duty of electric power supplied to the halogen heater to control the output of the halogen heater included in the fixing device. The “turn-on duty” is a ratio of a power-on time per unit time. The CPU typically controls the turn-on duty based on temperature data of the fixing belt. For example, in response to the temperature of the fixing belt that is significantly lower than the target temperature, the CPU increases the turn-on duty to increase the output of the halogen heater, which increases the amount of heat applied to the fixing belt. By contrast, in response to the temperature of the fixing belt that is close to the target temperature, the CPU decreases the turn-on duty to decrease the output of the halogen heater, which prevents the temperature of the fixing belt from greatly exceeding the target temperature.

As illustrated in FIG. 5, the turn-on duty was relatively large until 60 seconds elapsed after the start of printing, and thereafter, the turn-on duty gradually decreased. Then, after 240 seconds elapsed from the start of printing, the turn-on duty was stabilized at a relatively small value. The present inventors considered that executing the following control increased the turn-on duty in the initial stage after the start of printing and then decreased the turn-on duty after the initial stage.

Immediately after the CPU completes the warm-up operation and starts printing, the temperature of the fixing belt reaches the predetermined target temperature, but the heat is not accumulated so much in the pressure roller. For this reason, after the start of printing, the temperature of the fixing belt tends to decrease as the sheet passes. To prevent the temperature of the fixing belt from rapidly dropping, until 60 seconds elapse from the start of printing, the CPU executes the control that supplies a large amount of heat to the fixing belt, which increases the turn-on duty.

In contrast, after a certain time elapsed from the start of printing, the heat storage amount of the pressure roller increases. As a result, the heat stored in the pressure roller can compensate consumption of heat in the fixing belt caused by the sheet passing on the fixing belt. For this reason, after 240 seconds have elapsed after the start of printing, the heat stored in the pressure roller can prevent the temperature of the fixing belt from dropping due to the sheet passing without increasing the turn-on duty and maintain the temperature of the fixing belt at a predetermined temperature even with a relatively small turn-on duty.

As described above, in the initial stage after the start of printing, the turn-on duty of the halogen heater that tends to be large, and, as a result, the temperature of the unfixed toner heated by the halogen heater tends to increase. As a result, the present inventors considered that the FP/UFP generated from the toner increased as illustrated in FIG. 4 because the turn-on duty was large until three minutes elapsed from the start of printing as illustrated in FIG. 4. In addition, the present inventors considered that the pressure roller can store a certain amount of heat after three minutes have elapsed from the start of printing, and, as a result, even a relatively small turn-on duty enables maintaining the temperature of the fixing belt at the target temperature, which reduces the temperature to heat the unfixed toner and the occurrence of FP/UFP.

As a result, based on the above-described results of the experiments, the present inventors consider that reducing the amount of FP/UFP generated in the initial stage after the start of printing particularly and effectively reduces the FP/UFP generated by the image formation. To reduce the amount of FP/UFP generated in the initial stage after the start of printing, the CPU in the first embodiment of the present disclosure executes the following control of the turn-on duty of the halogen heater. The following describes a configuration of the CPU that controls the turn-on duty of the halogen heater and control of the turn-on duty in the first embodiment of the present disclosure.

<Configuration of Controller>

Figure 6:
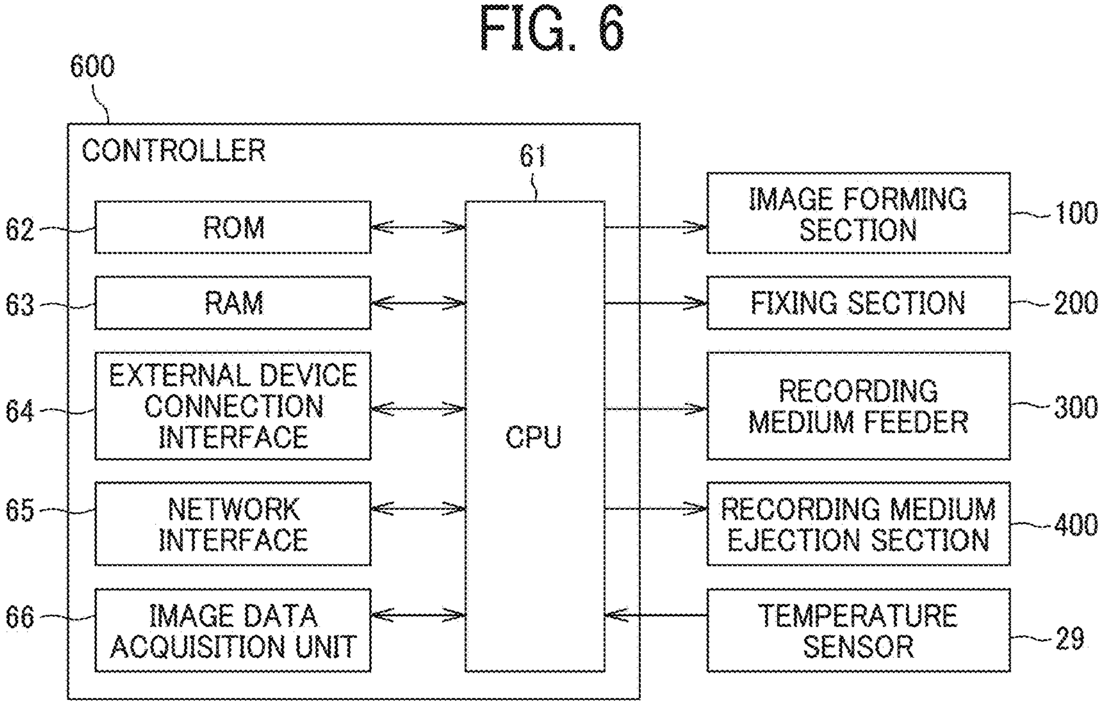
FIG. 6 is a block diagram of a configuration of a controller according to the first embodiment of the present disclosure.

FIG. 6 is a block diagram of the configuration of the controller according to the first embodiment of the present disclosure.

As illustrated in FIG. 6, a controller 600 includes a central processing unit (CPU) 61, a read-only memory (ROM) 62, a random-access memory (RAM) 63, an external device connection interface (I/F) 64, a network interface (I/F) 65, and an image data acquisition unit 66.

The CPU 61 controls the overall operation of the image forming apparatus in addition to the turn-on duty of the halogen heaters. Specifically, the CPU 61 controls various operations of the image forming section 100, the fixing section 200, the recording medium feeder 300, and the recording medium ejection section 400. The ROM 62 stores programs such as the IPL used for driving the CPU. The RAM 63 is used as a work area of the CPU 61.

The external device connection interface 64 is coupled to a personal computer (PC) through, for example, a universal serial bus (USB) cable, and communicates with the PC to exchange a control signal or image data for printing with the PC. The network interface 65 is an interface used to exchange data with an external device through a communication network such as the Internet. The image data acquisition unit 66 obtains the image data through the external device connection interface 64.

<Control of Turn-on Duty>

Figure 7:
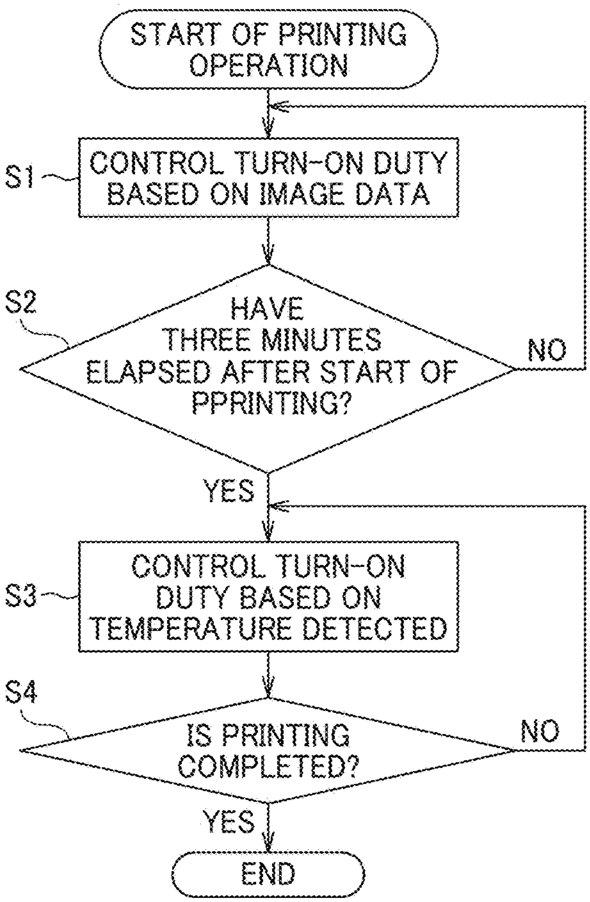
FIG. 7 is a flowchart of a control according to the first embodiment of the present disclosure to control a turn-on duty.

The control of the turn-on duty according to the first embodiment of the present disclosure is described below with reference to FIG. 7.

The image data acquisition unit 66 acquires image data of images to be printed to the sheets and ejected to the outside of the image forming apparatus. At the start of the printing operation, the image data acquisition unit 66 firstly sends, to the CPU 61, the image data of images to be printed to the sheets ejected within three minutes after the start of printing. Based on the image data of images to be printed to the sheets to be ejected within three minutes after the start of printing, the CPU 61 controls the turn-on duty of the halogen heater within three minutes after the start of printing in step S1 of FIG. 7.

For three minutes after the start of printing, the pressure roller does not sufficiently store the heat. For this reason, forming an image that requires a large amount of heat to fix the image onto the sheet increases the turn-on duty of the halogen heater and is likely to cause the occurrence of the FP/UFP. To prevent the occurrence of the FP/UFP, the CPU 61 determines whether the large amount of heat to fix the image is required based on the image data. When the CPU 61 determines that the turn-on duty within three minutes after the start of printing is likely to be equal to or larger than a predetermined reference value, the CPU 61 sets the turn-on duty to a value smaller than a reference value. The above-described reference value is defined as a value of the turn-on duty at which the wax in the toner may volatilize when the CPU 61 executes a typical control that determines the turn-on duty based on the temperature of the fixing belt. The reference value in the following description has the same meaning. When the CPU 61 determines that the turn-on duty is likely to be equal to or larger than the predetermined reference value, the CPU 61 sets the turn-on duty to be smaller than the reference value so that the wax in the toner does not volatilize. On the other hand, when the CPU 61 determines that the turn-on duty is likely to be smaller than the predetermined reference value within three minutes after the start of printing, the CPU 61 determines the turn-on duty based on the temperature of the fixing belt detected by the temperature sensor.

Subsequently, the CPU 61 determines whether three minutes have elapsed after the start of printing in step S2. When the CPU determines that three minutes have elapsed after the start of printing (YES in Step2 of FIG. 7), the CPU 61 changes the control of the turn-on duty of the halogen heater from the control based on the image data to the typical control based on the temperature of the fixing belt. Specifically, the CPU 61 controls the turn-on duty of the halogen heater based on the temperature of the fixing belt detected by the temperature sensor in step S3 of FIG. 7, not based on the image data sent from the image data acquisition unit 66. Thereafter, the CPU 61 executes the typical control based on the temperature of the fixing belt in the same manner. Subsequently, the CPU 61 determines whether the image forming apparatus completes printing on all sheets of the printing operation in step S4. When the CPU 61 determines that the image forming apparatus completes printing on all the sheets (YES in step S4 of FIG. 7), the CPU 61 ends the control of the turn-on duty.

As described above, in the first embodiment of the present disclosure, controlling the turn-on duty of the halogen heater within three minutes after the start of printing based on the image data of images to be printed to the sheets to be ejected within three minutes after the start of printing can reduce the amount of FP/UFP generated in the initial stage after the start of printing. In other words, when the image data of images to be printed to the sheets to be ejected within three minutes after the start of printing includes image data of image that increases the turn-on duty, the CPU 61 sets the value of the turn-on duty to the value smaller than the reference value, which can prevent the temperature in the nip from being higher than the volatilization temperature of the wax in the toner. As a result, the above-described control can prevent the wax in the toner from volatilizing in the initial stage after the start of printing and reduce the amount of FP/UFP discharged from the image forming apparatus.

In the control according to the first embodiment of the present disclosure, controlling the turn-on duty reduces the amount of FP/UFP that occurs in the image forming apparatus. Without adding a component to collect the FP/UFP such as a filter, the above-described control can reduce the amount of FP/UFP generated from the image forming apparatus, which reduces the number of components and a manufacturing cost.

The CPU 61 does not always determine whether the image data of images to be printed to the sheets to be ejected within three minutes after the start of printing includes image data of image that increases the turn-on duty based on the image data of all images to be printed to all sheets to be ejected within three minutes after the start of printing. For example, the CPU 61 may set the turn-on duty to the value smaller than the reference value when the CPU 61 determines that randomly selected five sheets includes three or more sheets having image data of images that are expected to cause the turn-on duty to be equal to or larger than the reference value. The number of sheets randomly selected and the number of sheets having the images to be used as a criterion for determining the turn-on duty may be appropriately changed.

Subsequently, a specific example of the control of the turn-on duty based on the image data is described.

<Control Based on Image Area Rate>

Figure 8A:
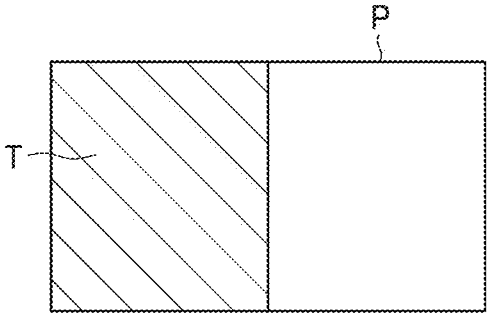
FIGS. 8A and 8B are diagrams to illustrate an image area rate.
Figure 8B:
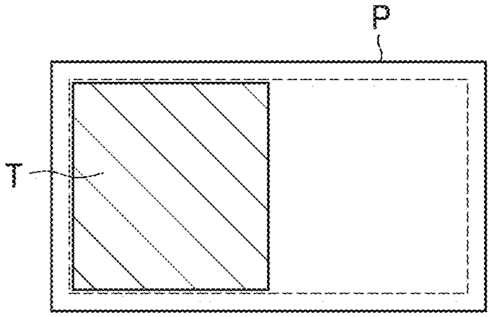

In the control of the turn-on duty based on the temperature of the fixing belt, an image area rate of an image on the sheet passing through the nip changes the turn-on duty. The image area rate is defined as a rate of an area of an image actually formed to an area on which an image can be formed on a sheet. For example, in a specification in which an image can be formed on a sheet without a margin, the image area rate is 50% when the toner T adheres to a half area of the entire area of the sheet P as illustrated in FIG. 8A. On the other hand, in a specification in which an image is always formed with a margin as illustrated in FIG. 8B, the image area rate is 50% when the toner T is adhered to a half area of a dotted line portion excluding the margin.

Figure 9A:
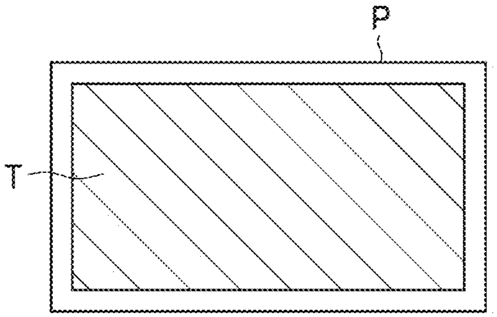
FIG. 9A is a diagram illustrating an example of an image that has a large image area rate.
Figure 9B:
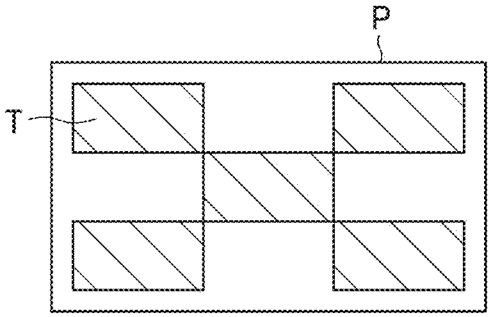
FIG. 9B is a diagram illustrating an example of an image that has a small image area rate.

The amount of heat to fix an image having a large image area rate as illustrated in FIG. 9A is larger than the amount of heat to fix an image having a small image area rate as illustrated in FIG. 9B. For this reason, the typical control of the heater based on the temperature of the fixing belt increases the turn-on duty of the halogen heater to fix the image having the large image area rate onto the sheet in particular in the initial stage after the start of printing, which is likely to cause the occurrence of the FP/UFP. To countermeasure the above, the CPU 61 determines whether the image forming apparatus forms an image having an image area rate larger than a predetermined image area rate on each of a predetermined number of sheets or more within three minutes after the start of printing. When the CPU 61 determines that the image forming apparatus forms the image having the image area rate larger than the predetermined image area rate on each of the predetermined number of sheets or more within three minutes after the start of printing, the CPU sets the value of the turn-on duty to the value smaller than the reference value. The above-described control can reduce the amount of FP/UFP generated in the initial stage after the start of printing. The image area rate is one of the image data acquired by the image data acquisition unit 66. Based on the image area rates sent from the image data acquisition unit 66, the CPU 61 controls the turn-on duty of the halogen heater within three minutes after the start of printing.

<Control Based on Toner Overlapping Ratio>

A toner overlapping ratio is one of the image data that affects the turn-on duty. The toner overlapping ratio means a ratio defined by the largest number of different color toners as different types of toner overlaid in the designated region of the sheet. For example, when a black single-color character having a toner overlapping ratio of 100% and a blue character having a toner overlapping ratio of 200% are on the designated region, the toner overlapping ratio in the designated region is 200% of the blue character. The toner overlapping ratio may be calculated based on the image data acquired by the image data acquisition unit 66. When toners of four colors such as yellow, magenta, cyan, and black are used, the maximum value of the toner overlapping ratio is 400%.

Figure 10A:
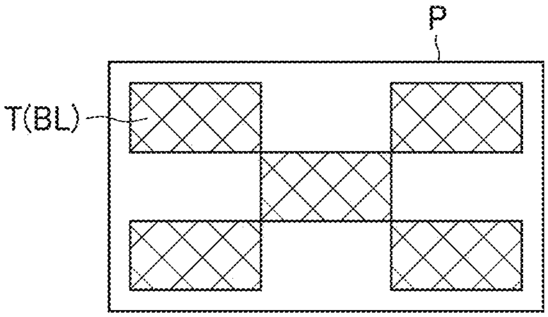
FIG. 10A is a diagram illustrating an example of an image that has a large toner overlapping ratio.
Figure 10B:
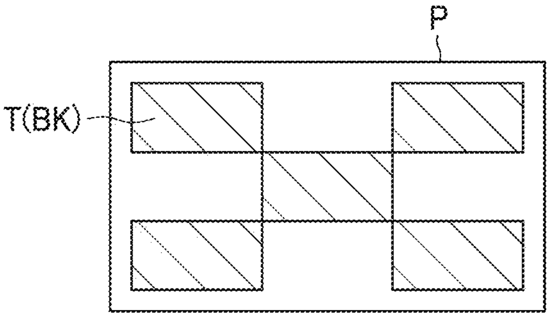
FIG. 10B is a diagram illustrating an example of an image that has a small toner overlapping ratio.

The image (for example, a blue image 90L) as illustrated in FIG. 10A has a larger toner overlapping ratio than the image (for example, a black monochrome image 90K) as illustrated in FIG. 10B and has a larger amount of toner per unit area than the image as illustrated in FIG. 10B. As a result, the amount of heat to fix the image as illustrated in FIG. 10A is larger than the amount of heat to fix the image as illustrated in FIG. 10B. For this reason, the typical control of the heater based on the temperature of the fixing belt increases the turn-on duty of the halogen heater to fix the image having the large toner overlapping ratio onto the sheet in particular in the initial stage after the start of printing, which is likely to cause the occurrence of the FP/UFP. To countermeasure the above, the CPU 61 determines whether the image forming apparatus forms an image having a toner overlapping ratio larger than a predetermined toner overlapping ratio on each of a predetermined number of sheets or more within three minutes after the start of printing. When the CPU 61 determines that the image forming apparatus forms the image having the toner overlapping ratio larger than the predetermined toner overlapping ratio on each of the predetermined number of sheets or more within three minutes after the start of printing, the CPU sets the value of the turn-on duty to the value smaller than the reference value. The above-described control can reduce the amount of FP/UFP generated in the initial stage after the start of printing.

In addition to the toner overlapping ratio, the CPU 61 may use the image area rate to control the turn-on duty. Based on both of the toner overlapping ratio and the image area rate in the image, the CPU 61 may determine whether the FP/UFP may occur. When the CPU 61 determines that the FP/UFP may occur, the CPU 61 sets the value of the turn-on duty to the value smaller than the reference value.

<Control Based on Size of Margin>

Figure 11:
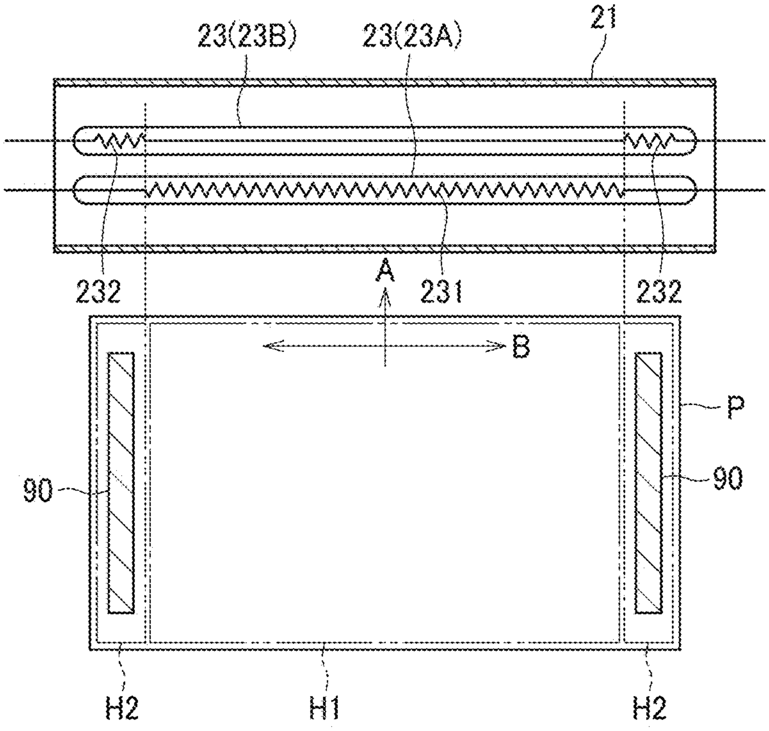
FIG. 11 is a schematic diagram illustrating an example of an image formed on a region heated by an end heater.

FIG. 11 is a schematic diagram illustrating a central heater 23A, an end heater 23B, and a sheet bearing toner images 90 on both ends of the sheet in a width direction B orthogonal to a conveyance direction A. The two halogen heaters 23 of the fixing device include a central heater 23A as a central heat source that heats a central portion of the fixing belt 21 in the longitudinal direction and an end heater 23B as an end heat source that heats both end portions of the fixing belt 21 in the longitudinal direction.

The central heater 23A includes a heat generator 231 disposed in the center region of the central heater 23A facing the center region of the sheet P in the width direction. On the other hand, the end heater 23B includes two heat generators 232 arranged on both end regions of the end heater 23B in the width direction of the sheet P, and positions of both end regions are outside the heat generator 231 of the central heater 23A in the width direction.

In the example illustrated in FIG. 11, since toner images 90 are formed on heated regions H2 that are heated by the end heater 23B, heat generation of the end heater 23B heats and fixes the toner images 90 onto the sheet P. At this time, when the end heater 23B generates heat within three minutes after the start of printing, the CPU sets the value of the turn-on duty of the end heater 23B to the value smaller than the reference value, which can reduce the amount of FP/UFP generated.

In the example of FIG. 11, no image is formed in the heated region H1 that is heated by the central heater 23A, but the central heater 23A may generate heat in addition to the heat generation of the end heater 23B. However, since the heat generation of the central heater 23A does not generate FP/UFP, the CPU 61 performs the typical control based on the temperature of the fixing belt to determine the turn-on duty of the central heater 23A.

Figure 12:
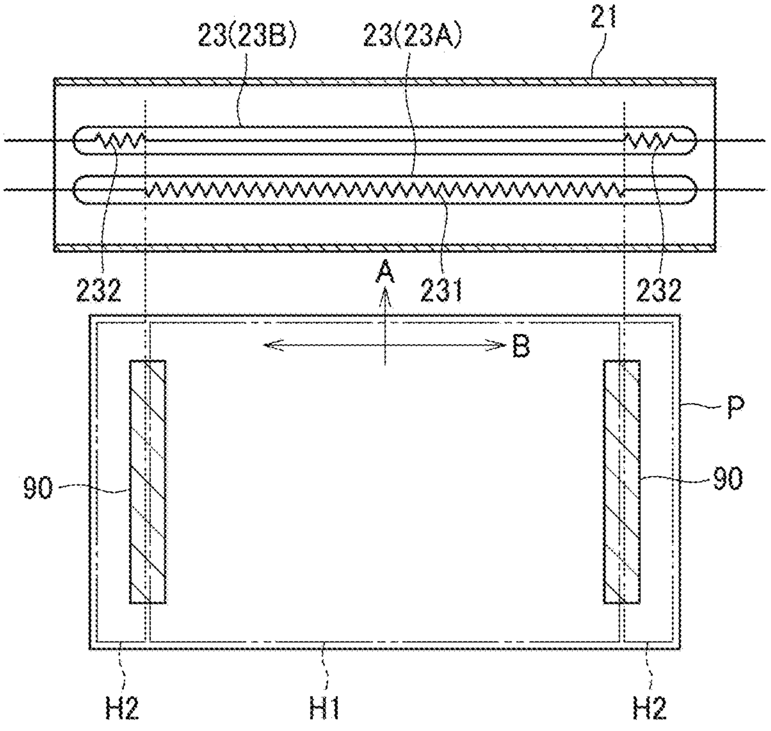
FIG. 12 is a schematic diagram illustrating an example of an image formed on both a region heated by a central heater and a region heated by an end heater.

In the example illustrated in FIG. 12, since the toner images 90 are formed on both the heated region H1 heated by the central heater 23A and the heated regions H2 heated by the end heater 23B, both the central heater 23A and the end heater 23B generate heat to heat the toner images 90. At this time, when the central heater 23A and the end heater 23B generate heat within three minutes after the start of printing, the CPU sets each of the value of the turn-on duty of the central heater 23A and the value of the turn-on duty of the end heater 23B to the value smaller than the reference value, which can reduce the amount of FP/UFP generated.

Figure 13:
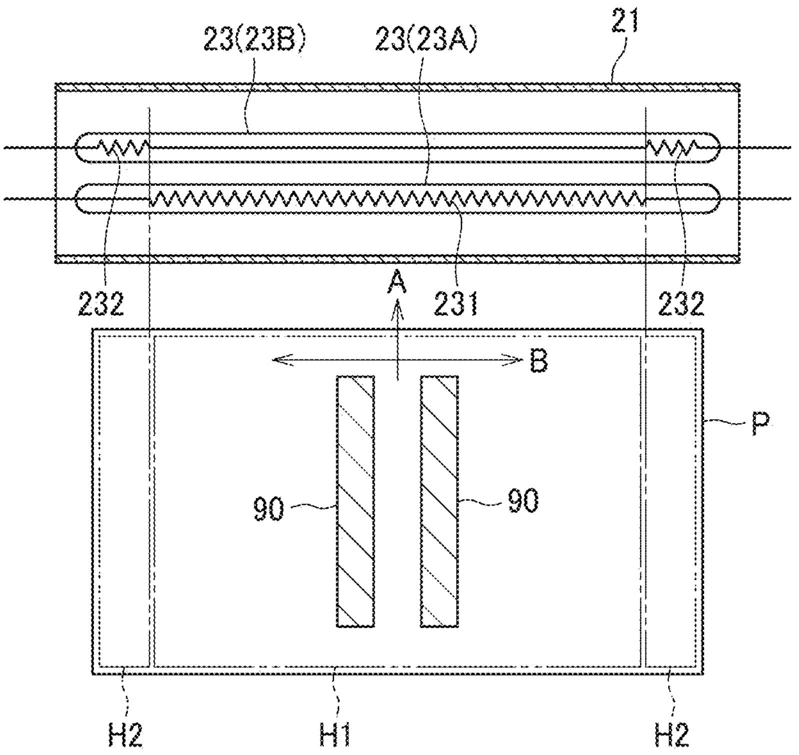
FIG. 13 is a schematic diagram illustrating an example of an image formed on a region heated by a central heater.

In the example illustrated in FIG. 13, since toner images 90 are formed on the heated region H1 heated by the central heater 23A, the central heater 23A generates heat to heat the toner images 90, and the end heater 23B may not generate heat. At this time, when the central heater 23A generates heat within three minutes after the start of printing, the CPU sets the value of the turn-on duty of the central heater 23A to the value smaller than the reference value, which can reduce the amount of FP/UFP generated.

As described above, the CPU 61 identifies positions at which the toner image 90 is formed and controls heaters to heat the toner image 90. In this case, the CPU 61 sets the value of the turn-on duty of the heater that mainly heats the toner image 90 to the value smaller than the reference value, which can reduce the amount of FP/UFP generated.

Figure 14:
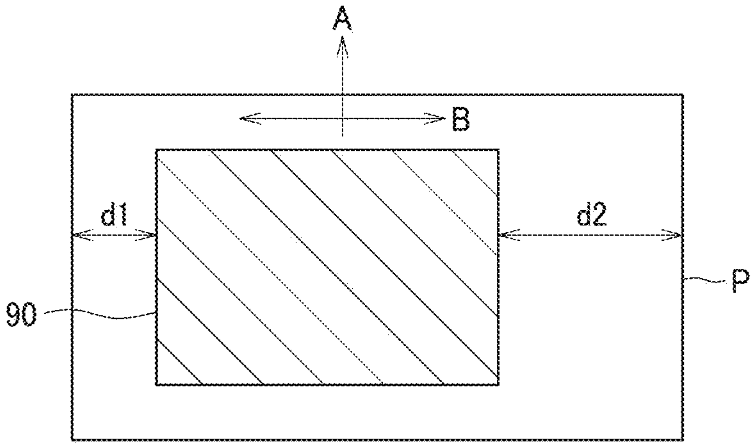
FIG. 14 is a diagram to illustrate the widths of margins.

As illustrated in FIG. 14, the CPU 61 may identify the position at which the toner image 90 is formed based on the widths d1 and d2 of the margins from both ends of the sheet P to the toner image 90 in the width direction of the sheet P. The CPU 61 can obtain the widths d1 and d2 of the margins from the image data acquired by the image data acquisition unit 66. The CPU 61 identifies the position of the toner image 90 on the sheet P based on the widths d1 and d2 of the margins and controls the turn-on duty of the heater that heats the toner image 90 based on the position of the toner image 90.

The CPU 61 may control the turn-on duty in consideration of the toner overlapping ratio in addition to the position of the toner image. For example, the CPU 61 may set the turn-on duty as illustrated in Table 1 below.

TABLE 1

| Toner overlapping ratio in Region heated by Central heater | Toner overlapping ratio in Region heated by End heater | Reduction level of Turn-on duty |
|---|---|---|
| 150% | 100% | Level 1 |
| 200% | 150% | Level 2 |
| 250% or more | 200% or more | Level 3 |

In Table 1, the CPU 61 individually sets the reduction levels of the turn-on duties of the central heater 23A and the end heater 23B in the heated region H1 heated by the central heater 23A and the heated region H2 heated by the end heater 23B based on the position of the image and the toner overlapping ratio. Specifically, in response to a toner overlapping ratio of 150% in the heated region H1 heated by the central heater 23A, the CPU 61 sets the reduction level of the turn-on duty of the central heater 23A to "level 1." As the toner overlapping ratio increases, the CPU 61 increases the reduction level of the turn-on duty to "level 2" or "level 3," which means largely reducing the turn-on duty. In the typical control based on the temperature of the fixing belt, the turn-on duty increases as the toner overlapping ratio increases. For this reason, The CPU 61 increases a reduction amount of the turn-on duty of the central heater 23A from the reference value so that the temperature in the nip is not higher than the volatilization temperature of the wax in the toner. Similar to the central heater 23A, the CPU 61 increases a reduction amount of the turn-on duty of the end heater 23B as the toner overlapping ratio in the heated region H2 increases. In the above example, the CPU 61 sets the reduction level of the turn-on duty of the end heater 23B to be higher than the reduction level of the turn-on duty of the central heater 23A even when the toner overlapping ratio in the heated region H1 is the same as the toner overlapping ratio in the heated region H2 to effectively prevent the occurrence of FP/UFP on both end sides of the fixing device. The temperature in each of both end sides of the fixing device is more easily rise than the temperature in the center of the fixing device in the width direction of the sheet.

As described above, controlling the turn-on duty in consideration of the toner overlapping ratio in addition to the position of the toner image obtained from the margin data can more effectively reduce the amount of FP/UFP generated in the image forming apparatus.

Alternatively, the CPU 61 may control the turn-on duty based on the position of the toner image and the image area rate in each of the heated regions H1 and H2, the control is not limited to performing based on the position of the toner image and the toner overlapping ratio. The CPU 61 may control the turn-on duty based on the toner overlapping ratio in addition to the position of the toner image and the image area rate.

<Preheating Control>

Executing the control that reduces the heat generation amount of the halogen heater within three minutes after the start of printing can prevent the occurrence of FP/UFP, but may cause a decrease in performance to fix the toner image. To prevent the decrease in performance to fix the toner image, it is preferable to increase the amount of heat stored in the fixing device in advance when the CPU 61 determines reducing the output of the halogen heater within three minutes after the start of printing. To increase the amount of heat stored in the fixing device, the CPU 61 preferably controls at least one of a preheating time or a preheating temperature to preheat the fixing device or a component such as the pressure roller. The "preheating time" is defined as a time from the start of heating by the halogen heater until the first sheet reaches the nip in the fixing device, and the "preheating temperature" is defined as a temperature of the halogen heater heating the fixing device or the component from the start of heating by the halogen heater until the first sheet reaches the nip in the fixing device.

When the CPU 61 executes the control reducing the output of the halogen heater within three minutes after the start of printing, the CPU extends the preheating time to be longer than the preheating time when the CPU executes the typical control that does not reduce the output, which can increase the amount of heat stored in the fixing device or the component such as the pressure roller. Alternatively, increasing the preheating temperature can increase the amount of heat stored in the fixing device or the component.

As described above, extending the preheating time or increasing the preheating temperature can increase the amount of heat stored in the fixing device or the component such as the pressure roller to compensate for the shortage of the amount of heat in the fixing belt. The above-described control can prevent the decrease in performance to fix the toner image, which is caused by reducing the output of the halogen heater, and enables obtaining good performance to fix the toner image.

The first embodiment of the present disclosure has been described above.

In the first embodiment of the present disclosure, controlling the output (that is the turn-on duty) of the halogen heater within three minutes after the start of printing based on the image data (such as the image area rate, the toner overlapping ratio, the margin width) of the images printed on the sheets ejected within three minutes after the start of printing can reduce the amount of the FP/UFP generated in the initial stage after the start of printing. As a result, an environmentally friendly image forming apparatus can be provided. Without adding a component to collect the FP/UFP such as a filter, the above-described control can reduce the amount of FP/UFP, which reduces the number of components and the manufacturing cost.

The control according to the present disclosure may be applied to the printing operation that continues for three minutes or more after the start of printing, and also to the printing operation that finishes before three minutes elapse after the start of printing, in other words, within three minutes after the start of printing. Applying the control according to the present disclosure to the printing operation that finishes within three minutes can reduce the amount of FP/UFP generated in the initial stage in which a lot of FP/UFP tends to occur.

The control according to the present disclosure may be applied to the printing operation starting from a standby mode of the fixing device that shifts the standby mode after the power supply of the image forming apparatus is turned on, in addition to the printing operation starting after the power supply is turned on. In other words, the control according to the present disclosure is applied to the printing operation that starts the heat generation of the halogen heater from when no sheet passes through the fixing device and the halogen heater does not generate heat.

The fixing device disposed in the image forming apparatus according to the present disclosure is not limited to the fixing device 20 illustrated in FIG. 2. For example, the present disclosure is also applicable to an image forming apparatus including a fixing device as follows.

Figure 15:
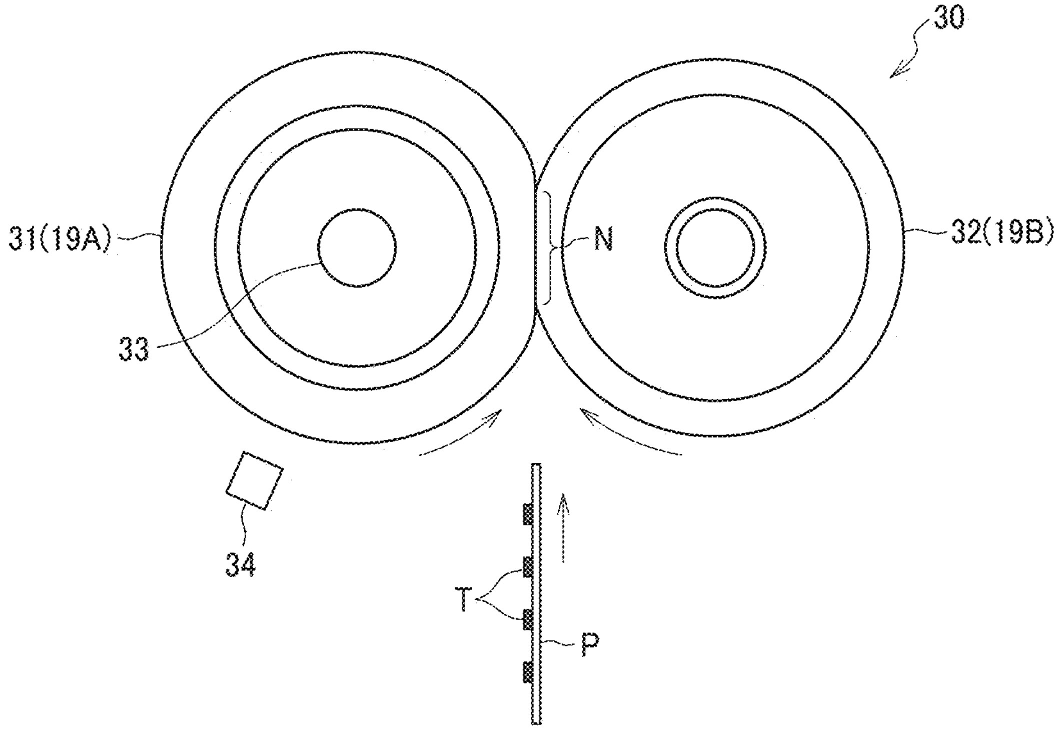
FIG. 15 is a schematic diagram illustrating a configuration of a fixing device according to a second embodiment of the present disclosure.

FIG. 15 is a schematic diagram illustrating a configuration of a fixing device according to a second embodiment of the present disclosure.

A fixing device 30 illustrated in FIG. 15 includes a fixing roller 31 as the first rotator 19A disposed on the image bearing side of the sheet P on which the unfixed image is borne (in other words, the toner image T side). The fixing roller 31 contacts a pressure roller 32 as a second rotator 19B to form a nip N. The fixing roller 31 includes, for example, a cylindrical core, an elastic layer provided on the outer circumferential surface of the core, and a release layer covering the elastic layer. A halogen heater 33 is disposed inside the core of the fixing roller 31. As a result, the halogen heater 33 radiates infrared rays, and the radiant heat heats the inner face of the fixing roller 31. The CPU 61 controls the output of the halogen heater 33 based on the temperature of the fixing roller 31 detected by a temperature sensor 34.

In the above-described fixing device 30 including the fixing roller 31, an increase in the turn-on duty of the halogen heater 33 in the initial stage after the start of printing may cause the volatilization of the wax in the toner heated in the nip N, and the FP/UFP may occur. To prevent the occurrence of the FP/UFP, the present disclosure may be applied to the image forming apparatus including the fixing device 30. When the FP/UFP is likely to occur in the initial stage after the start of printing, reducing the turn-on duty of the halogen heater 33 based on the image data within three minutes after the start of printing can reduce the amount of FP/UFP generated.

The above-described embodiments of the present disclosure have at least the following aspects.

First Aspect

In a first aspect, an image forming apparatus includes a fixing device and circuitry. The fixing device includes a pair of rotators and a heater. The pair of rotators forms a nip through which recording media pass in a conveyance direction. The heater heats at least one of the pair of rotators to fix images printed on the recording media. The circuitry is configured to acquire image data of the images to be printed on the recording media within three minutes after a start of printing the images on the recording media and set an output of the heater to be lower than a predetermined reference value within the three minutes after the start of printing based on the image data.

Second Aspect

In a second aspect, the circuitry in the image forming apparatus according to the first aspect acquires the image data including image area rates of the images printed on the recording media.

Third Aspect

In a third aspect, the image forming apparatus according to the first aspect or the second aspect includes image forming units to form toner images by different types of toner on the recording media, and the circuitry acquires the image data including toner overlapping ratios of the toner images printed on the recording media.

Fourth Aspect

In a fourth aspect, the circuitry in the image forming apparatus according to any one of the first to third aspects acquires the image data including a width of a margin from an end of each of the recording media to each of the images in a width direction orthogonal to the conveyance direction.

Fifth Aspect

In a fifth aspect, the circuitry in the image forming apparatus according to any one of the first to fourth aspects is configured to control the heater to preheat the fixing device until a first recording medium of the recording media reaches the nip after the heater starts heating and set at least one of a preheating time or a preheating temperature to preheat the fixing device based on the image data.

Sixth Aspect

In a sixth aspect, the pair of rotators in the image forming apparatus according to any one of the first to fourth aspects includes a first rotator facing an image bearing side of the recording medium on which an unfixed image is borne and a second rotator disposed to face an outer circumferential face of the first rotator, and the circuitry is configured to control the heater to preheat the second rotator until a first recording medium of the recording media reaches the nip after the heater starts heating and set at least one of a preheating time or a preheating temperature to preheat the second rotator based on the image data.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, ASICs ("Application Specific Integrated Circuits"), FPGAs ("Field-Programmable Gate Arrays"), and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

There is a memory that stores a computer program which includes computer instructions. These computer instructions provide the logic and routines that enable the hardware (e.g., processing circuitry or circuitry) to perform the method disclosed herein. This computer program can be implemented in known formats as a computer-readable storage medium, a computer program product, a memory device, a record medium such as a CD-ROM or DVD, and/or the memory of a FPGA or ASIC.

The invention claimed is:

1. An image forming apparatus comprising:

a fixing device including:

a pair of rotators to form a nip through which recording media pass in a conveyance direction; and a heater to heat at least one of the pair of rotators to fix images printed on the recording media; and circuitry configured to:

acquire image data of the images to be printed on the recording media within three minutes after a start of printing the images on the recording media;

set an output of the heater to be lower than a predetermined reference value within the three minutes after the start of printing based on the image data; and reduce a turn-on duty of the heater in response to an increase in a toner overlapping ratio of an image formed on the recording media.

2. The image forming apparatus according to claim 1, wherein the circuitry is further configured to acquire the image data including image area rates of the images printed on the recording media.

3. The image forming apparatus according to claim 1, further comprising:

image forming units to form toner images by different types of toner on the recording media, wherein the circuitry is further configured to acquire the image data including toner overlapping ratios of the toner images printed on the recording media.

4. The image forming apparatus according to claim 1, wherein the circuitry is further configured to acquire the image data including a width of a margin from an end of each of the recording media to each of the images in a width direction orthogonal to the conveyance direction.

5. The image forming apparatus according to claim 1, wherein the circuitry is further configured to:

control the heater to preheat the fixing device until a first recording medium of the recording media reaches the nip after the heater starts heating; and set at least one of a preheating time or a preheating temperature to preheat the fixing device based on the image data.

6. The image forming apparatus according to claim 1, wherein the pair of rotators includes:

a first rotator facing an image bearing side of the recording media on which an unfixed image is borne; and a second rotator disposed to face an outer circumferential face of the first rotator, and the circuitry is further configured to:

control the heater to preheat the second rotator until a first recording medium of the recording media reaches the nip after the heater starts heating; and set at least one of a preheating time or a preheating temperature to preheat the second rotator based on the image data.

* * * * *